(No Model.)

L. ZWIESLER & J. MENCHEN.
WEIGHING AND MEASURING SCOOP.

No. 421,221. Patented Feb. 11, 1890.

WITNESSES:
F. G. Fischer
A. A. Higdon

INVENTORS:
L. Zwiesler and J. Menchen.
BY Higdon & Higdon
ATTORNEYS.

UNITED STATES PATENT OFFICE.

LOUIS ZWIESLER AND JOSEPH MENCHEN, OF KANSAS CITY, MISSOURI.

WEIGHING AND MEASURING SCOOP.

SPECIFICATION forming part of Letters Patent No. 421,221, dated February 11, 1890.

Application filed July 16, 1889. Serial No. 317,725. (No model.)

*To all whom it may concern:*

Be it known that we, LOUIS ZWIESLER and JOSEPH MENCHEN, of Kansas City, Jackson county, Missouri, have invented certain new and useful Improvements in Weighing and Measuring Scoops, of which the following is a full, clear, and exact description, reference being had to the accompanying drawings, forming a part hereof.

Our invention relates to an improvement in combined weighing and measuring scoops adapted to be used for weighing and measuring groceries and other similar commodities; and it consists in the peculiar construction and combination of devices that will be more fully set forth hereinafter, and particularly pointed out in the claim.

This invention is an improvement on the weighing and measuring scoop described in Letters Patent of the United States granted to Louis Zwiesler June 18, 1889, No. 405,648, and the object of our present improvements is to simplify the construction and enhance the utility and durability of the scoop.

Figure 1:
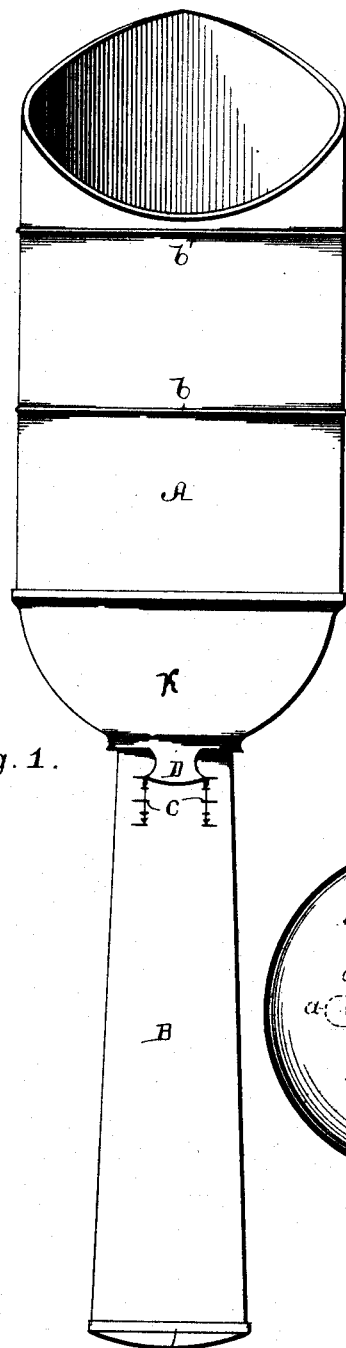
Figure 2:
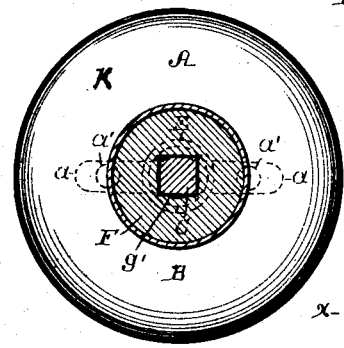
Figure 3:
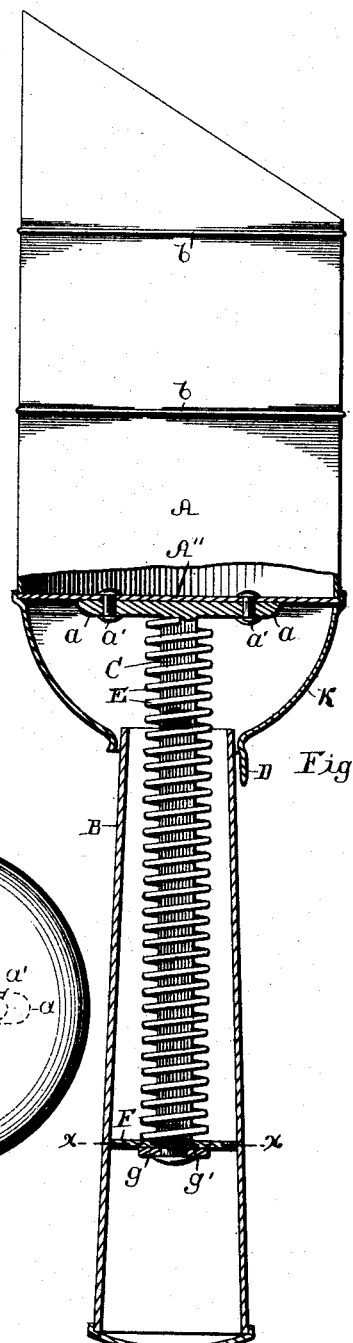

In the accompanying drawings, Figure 1 is an elevation of a weighing and measuring scoop embodying our improvements. Fig. 2 is a sectional view of the same, taken on the line $x\, x$ of Fig. 3. Fig. 3 is an elevation, partly in section, of the same at right angles to Fig. 1.

The scoop A is cylindrical in form, has its upper edge beveled or inclined to a point to facilitate its introduction into a commodity, and the scoop is further provided at the required intervals with beads $b\, b$, which indicate pints, quarts, or other quantities for the measurement of the contents of the scoop. The rod C, which is square in cross-section, has right-angled arms $a$ formed at its inner end, which arms are secured to the bottom A′ of the scoop by rivets $a'$. The rear portion K of the scoop is semi-spherical in shape and has at its lower side an opening, which is circular in form, and an indicator or pointer D, the latter extending downward. The handle B is slightly tapered in form, being smallest at its inner end, has a cap $e$ at its outer end, and is provided at a suitable distance from its outer end with a diaphragm F, in the center of which is a square opening $g'$, through which the outer portion of the squared rod C extends. To the extreme outer end of the rod is riveted a washer $g$, which prevents the rod from being withdrawn from the handle. The inner end of the handle extends through the opening in the rear portion K, said handle and the rod forming guides for the scoop and enabling the latter to move in and out independently of the handle, as will be apparent. A coiled extensile spring E is arranged on the rod, its inner end bearing against the arms $a$ and its outer end bearing on the diaphragm F. The said spring supports the scoop, and when the latter is partly or entirely filled and held in a vertical position the weight of the contents of the scoop causes the latter to descend against the resistance of the spring, and the pointer, moving on the handle, comes to rest at the appropriate mark or figure on the scale $c$, inscribed on the handle, thus indicating the weight of the contents of the scoop. Owing to the square form of the rod and of the opening in the diaphragm, the scoop is prevented from turning on the handle. A scoop thus constructed is strong and durable and possesses great advantages in points of cheapness and simplicity.

Having thus described our invention, we claim—

In a weighing-scoop, the combination of the scoop having the rear portion K, provided with the opening and the pointer D, the rod secured to the scoop, the handle extending loosely through the opening in the rear portion and having the scale $c$ and the diaphragm forming the guide for the rod, and the spring coiled around the rod, having its outer end supported on the diaphragm and its inner end bearing against the scoop, substantially as described.

In testimony whereof we affix our signatures in presence of two witnesses.

LOUIS ZWIESLER.
     JOSEPH MENCHEN.

Witnesses:
 F. G. FISHER,
 A. A. HIGDON.